United States Patent
Ohno et al.

(10) Patent No.: US 10,138,950 B2
(45) Date of Patent: Nov. 27, 2018

(54) DRIVING FORCE TRANSMISSION DEVICE

(71) Applicant: JTEKT Corporation, Osaka-shi (JP)

(72) Inventors: Shun Ohno, Anjo (JP); Akio Matsumoto, Anjo (JP)

(73) Assignee: JTEKT CORPORATION, Osaka-shi (JP)

( * ) Notice: Subject to any disclaimer, the term of this patent is extended or adjusted under 35 U.S.C. 154(b) by 72 days.

(21) Appl. No.: 15/202,761

(22) Filed: Jul. 6, 2016

(65) Prior Publication Data
US 2017/0009817 A1    Jan. 12, 2017

(30) Foreign Application Priority Data

Jul. 7, 2015   (JP) ................................ 2015-135923

(51) Int. Cl.
| | | |
|---|---|---|
| *F16D 13/74* | (2006.01) | |
| *F16D 13/64* | (2006.01) | |
| *F16D 13/52* | (2006.01) | |
| *F16D 25/12* | (2006.01) | |

(52) U.S. Cl.
CPC .............. *F16D 13/74* (2013.01); *F16D 13/52* (2013.01); *F16D 13/648* (2013.01); *F16D 25/123* (2013.01); *F16D 2300/06* (2013.01); *F16D 2300/26* (2013.01)

(58) Field of Classification Search
USPC ..................................................... 192/113.35
See application file for complete search history.

(56) References Cited

U.S. PATENT DOCUMENTS

| | | | | |
|---|---|---|---|---|
| 3,366,210 A | * | 1/1968 | Webster .................. | F16D 13/74 188/264 E |
| 4,544,055 A | * | 10/1985 | Kronstadt ............... | F16D 13/74 192/113.36 |
| 4,566,572 A | * | 1/1986 | Flotow .................... | F16D 13/52 192/113.34 |
| 5,706,694 A | * | 1/1998 | Bhookmohan ........ | B21D 53/28 192/70.12 |
| 8,910,766 B2 | * | 12/2014 | Kriebernegg ........... | F16D 13/52 192/113.35 |
| 9,096,125 B2 | * | 8/2015 | Suzuki .................. | B60K 17/344 |
| 2007/0037659 A1 | * | 2/2007 | Bailey ..................... | F16D 25/10 475/296 |
| 2014/0251083 A1 | | 9/2014 | Suzuki et al. | |
| 2017/0089404 A1 | * | 3/2017 | Ohno ...................... | F16D 13/40 |

FOREIGN PATENT DOCUMENTS

JP   2013-100079   5/2013

* cited by examiner

*Primary Examiner* — Mark A Manley
(74) *Attorney, Agent, or Firm* — Oblon, McClelland, Maier & Neustadt, L.L.P.

(57) ABSTRACT

Provided is a driving force transmission device that can achieve further reduction in drag torque when it is not in operation and thus is not transmitting a driving force. A driving force transmission device includes: a clutch hub and a clutch drum; inner clutch plates spline-fitted on the clutch hub; outer clutch plates spline-fitted in the clutch drum; and a housing having a second accommodating chamber accommodating the clutch hub and the clutch drum. The inner clutch plates and the outer clutch plates are lubricated by lubricant. The driving force transmission device further includes a fin plate. The fin plate rotates with the clutch hub. By this rotation, the fin plate scoops up the lubricant in the second accommodating chamber to feed the lubricant to a reservoir chamber formed in the housing.

14 Claims, 11 Drawing Sheets

(FIRST EMBODIMENT)

(FIRST EMBODIMENT)

(FIRST EMBODIMENT)

(FIRST EMBODIMENT)

FIG. 7
(FIRST EMBODIMENT)
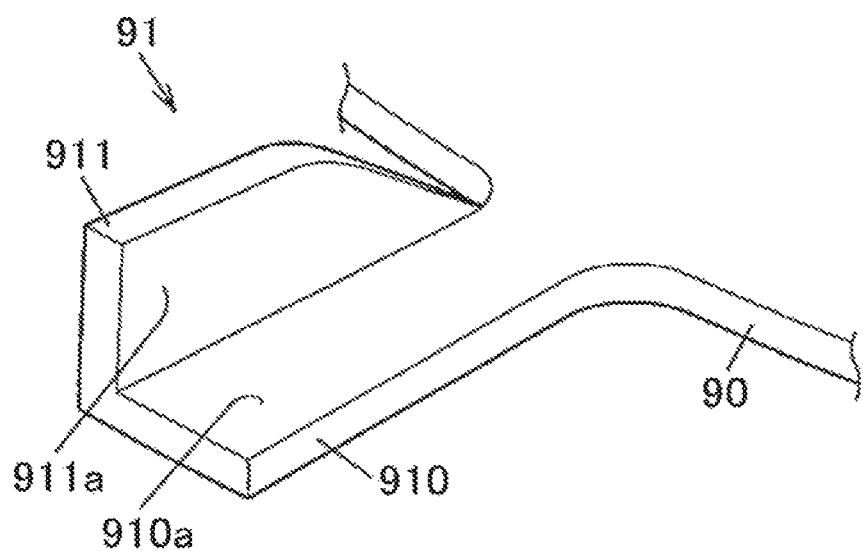
Side view
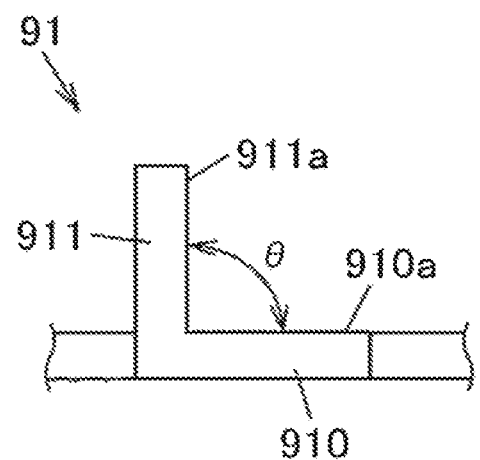

(FIRST EMBODIMENT)

(FIRST EMBODIMENT)

(SECOND EMBODIMENT)

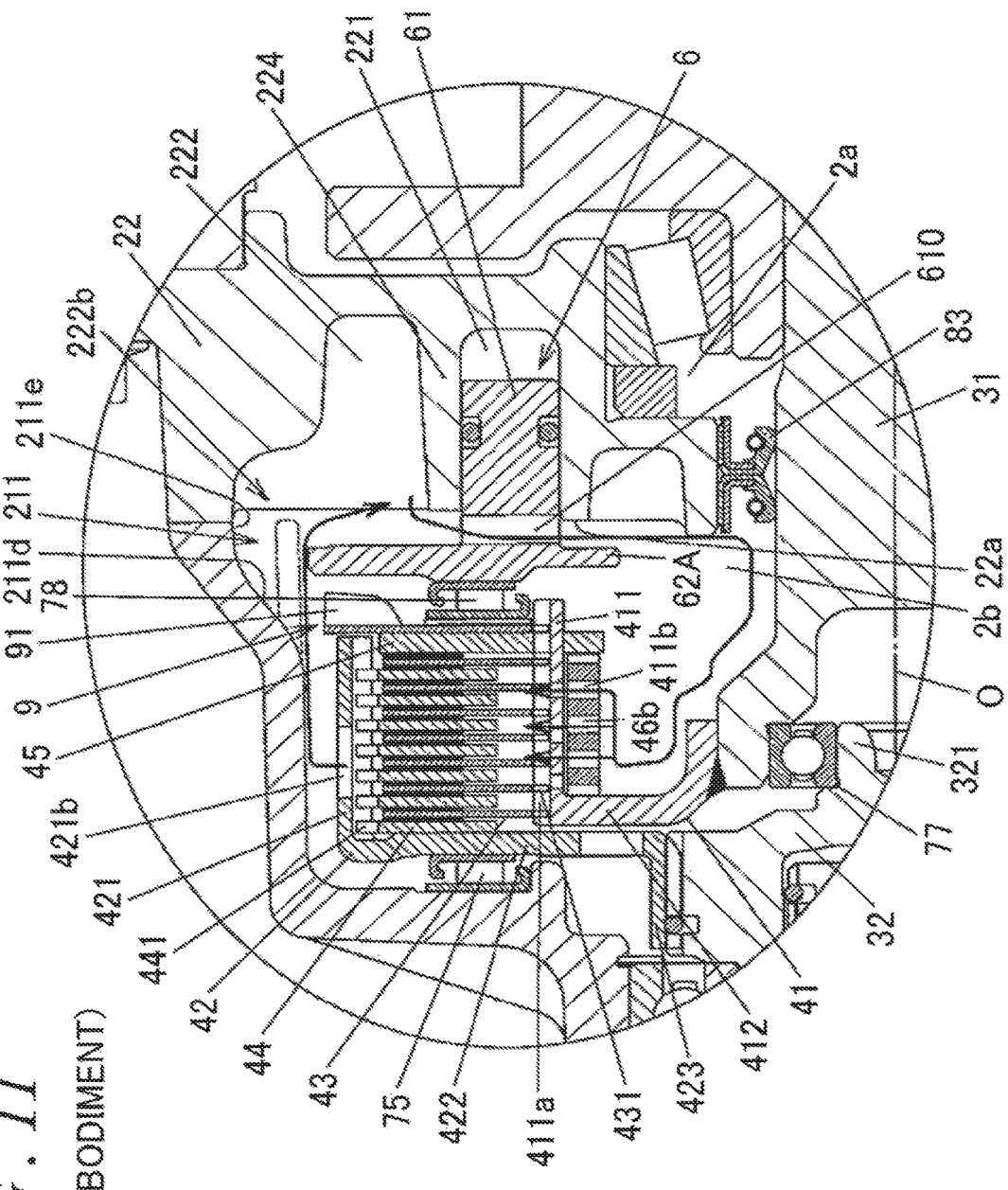
FIG. 11 (SECOND EMBODIMENT)

DRIVING FORCE TRANSMISSION DEVICE

INCORPORATION BY REFERENCE

The disclosure of Japanese Patent Application No. 2015-135923 filed on Jul. 7, 2015 including the specification, drawings and abstract, is incorporated herein by reference in its entirety.

BACKGROUND OF THE INVENTION

1. Field of the Invention

The present invention relates to driving force transmission devices that transmit a driving force by friction between a plurality of clutch plates.

2. Description of the Related Art

Conventionally, a driving force transmission device is known which is mounted on, e.g., a four-wheel drive vehicle having main driving wheels to which a driving force of a driving source is constantly transmitted and auxiliary driving wheels to which the driving force of the driving source is transmitted in accordance with the traveling state of the vehicle, and which can permit and cut off transmission of the driving force of the driving source to the auxiliary driving wheels (see, e.g., Japanese Patent Application Publication No. 2013-100079 (JP 2013-100079 A)).

The driving force transmission device described in JP 2013-100079 A includes: an inner shaft and a housing which can rotate relative to each other about the same axis; a case accommodating the inner shaft and the housing; outer clutch plates spline-fitted in the housing; inner clutch plates spline-fitted on the inner shaft; and cam mechanisms that generate cam thrust for the outer clutch plates and the inner clutch plates. Lubricant is present between the outer and inner clutch plates. The lubricant restrains wear that is caused by frictional sliding between the outer and inner clutch plates.

The case has a cylindrical accommodating chamber and a reservoir chamber. The housing and the outer and inner clutch plates are accommodated in the accommodating chamber. The reservoir chamber can temporarily store the lubricant contained in the accommodating chamber. The reservoir chamber opens to the accommodating chamber and is separated from the accommodating chamber by an annular partition wall that closes a part of the opening of the reservoir chamber. The reservoir chamber has a lubricant inlet port and a lubricant outlet port. The opening of the inlet port is not closed by the partition wall, and the outlet port is located downstream of the inlet port and discharges the stored lubricant into the accommodating chamber. The opening area of the outlet port is smaller than that of the inlet port.

When the driving force transmission device is not in operation and thus is not transmitting a driving force, drag torque may be generated due to viscosity of the lubricant that is present between the outer and inner clutch plates. In this driving force transmission device, a flow of the lubricant is formed in the rotational direction of the housing by a centrifugal force that is caused by rotation of the housing. The lubricant of this flow is introduced into the inlet port of the reservoir chamber and stored in the reservoir chamber. This reduces the amount of lubricant in the accommodating chamber accommodating the outer and inner clutch plates and thus reduces the drag torque that is generated when the driving force transmission device is not in operation.

In the driving force transmission device described in JP 2013-100079 A, however, the lubricant in the accommodating chamber is introduced into the reservoir chamber by the centrifugal force that is caused by rotation of the housing. Accordingly, for example, when the housing rotates at a low rotational speed, the amount of lubricant that is supplied to the reservoir chamber is reduced, and the lubricant remains in the accommodating chamber. The drag torque therefore may not be sufficiently reduced. The driving force transmission device described in JP 2013-100079 A therefore has room for improvement in terms of achieving further reduction in drag torque.

SUMMARY OF THE INVENTION

It is one object of the present invention to provide a driving force transmission device that can achieve further reduction in drag torque when it is not in operation and thus is not transmitting a driving force.

According to one aspect of the present invention, a driving force transmission device includes: a first rotary member to which a driving force generated by a driving source of a vehicle is applied; a second rotary member configured to rotate relative to the first rotary member about the same rotation axis as that of the first rotary member; a clutch unit formed by a first clutch plate that rotates with the first rotary member, and a second clutch plate that rotates with the second rotary member; an accommodating member that accommodates a part of the first and second rotary members; and a lubricant feed member. The driving force transmission device transmits the driving force from the first rotary member to the second rotary member by frictional engagement between the first and second clutch plates with lubricant therebetween. The accommodating member has an accommodating chamber that accommodates the clutch unit and a reservoir chamber that stores the lubricant. The lubricant feed member rotates with one of the first and second rotary members to feed the lubricant in the accommodating chamber to the reservoir chamber.

According to the present invention, the driving force transmission device can achieve further reduction in drag torque when it is not in operation and thus is not transmitting a driving force.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 7 shows the configuration of a blade portion of the fin plate, an enlarged perspective view of the blade portion being shown in the left half of FIG. 7, and a side view of the blade portion as the fin plate is viewed from the outside inward in the radial direction being shown in the right half of FIG. 7;

FIG. 11 is an enlarged view of a main part of the driving force transmission device shown in FIG. 10, illustrating the flow of lubricant in the driving force transmission device according to the second embodiment.

DETAILED DESCRIPTION OF EMBODIMENTS

Figure 1:
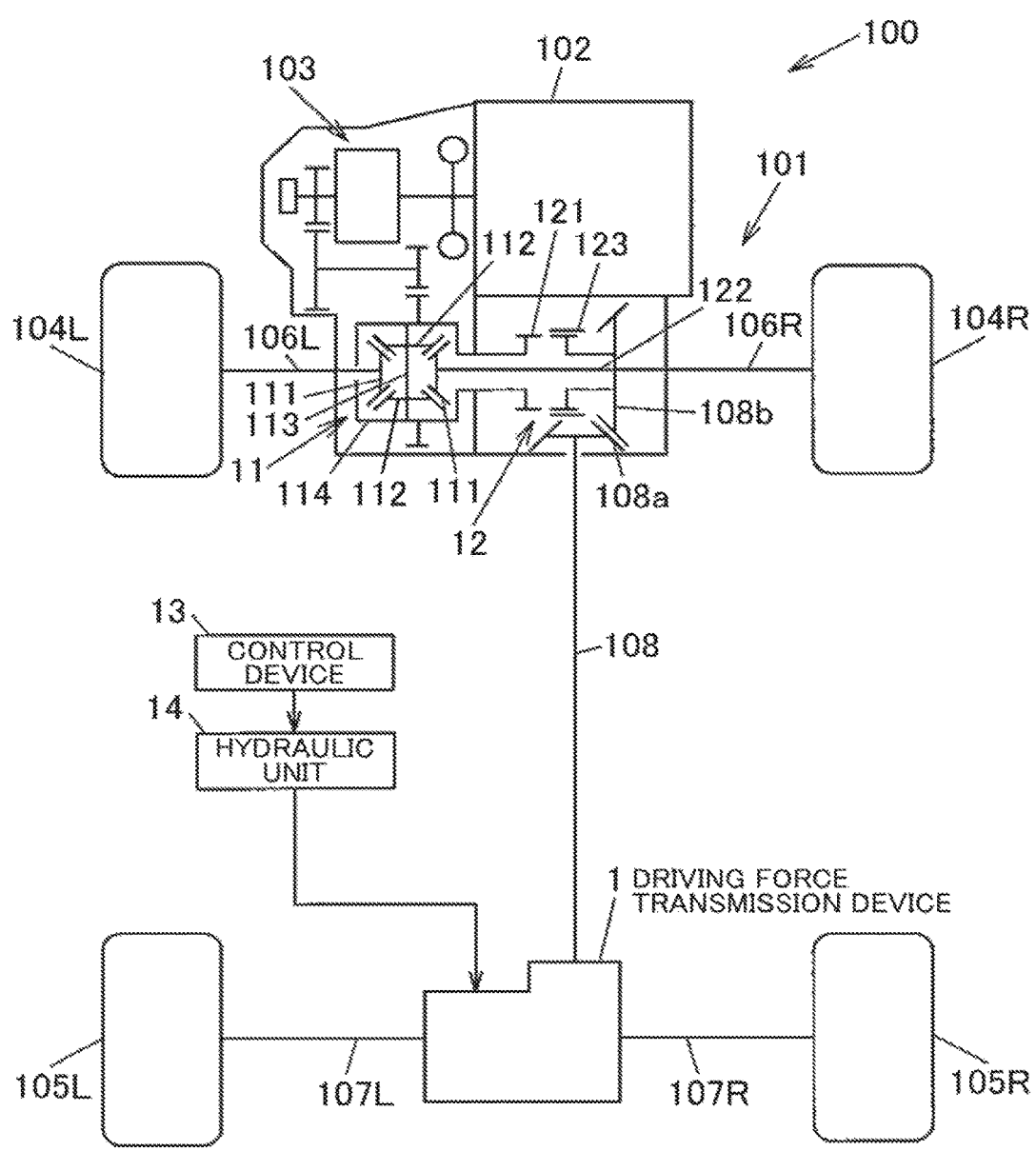
FIG. 1 is a diagram showing an example of the configuration of a four-wheel drive vehicle having mounted thereon a driving force transmission device according to a first embodiment of the present invention.

Embodiments of the present invention will be described below with reference to the accompanying drawings. FIG. 1 is a diagram showing an example of the configuration of a four-wheel drive vehicle having mounted thereon a driving force transmission device according to a first embodiment of the present invention.

A four-wheel drive vehicle 100 includes: an engine 102 as a driving source that generates a driving force for driving the four-wheel drive vehicle 100; a transmission 103; front wheels 104R, 104L as a pair of right and left main driving wheels; rear wheels 105R, 105L as a pair of right and left auxiliary driving wheels; a driving force transmission system 101 that can transmit the driving force of the engine 102 to the front wheels 104R, 104L and the rear wheels 105R, 105L; a control device 13; and a hydraulic unit 14. In the present embodiment, the letters "R" and "L" in the reference characters mean the right side and the left side as viewed in the direction in which the vehicle travels forward.

The four-wheel drive vehicle 100 can be switched between a four-wheel drive mode and a two-wheel drive mode. In the four-wheel drive mode, the driving force of the engine 202 is transmitted to the front wheels 104R, 104L and the rear wheels 105R, 105L. In the two-wheel drive mode, the driving force of the engine 102 is transmitted only to the front wheels 104R, 104L. The present embodiment is described with respect to the case where the engine as an internal combustion engine is used as the driving source. However, the present invention is not limited to this. A combination of the engine and a high power electric motor such as an interior permanent magnet (IMP) synchronous motor may be used as the driving source, or only the high power electric motor may be used as the driving source.

The driving force transmission system 101 includes a front differential 11, a dog clutch 12 as an engagement/disengagement mechanism that can cut off transmission of the driving force, a propeller shaft 108, a driving force transmission device 1, front drive shafts 106R, 106L, and rear drive shafts 107R, 107L. The driving force transmission system 101 transmits the driving force of the engine 102 to the front wheels 104R, 104L and the rear wheels 105R, 105L. The driving force of the engine 102 is constantly transmitted to the front wheels 104R, 104L. The driving force of the engine 102 is transmitted to the rear wheels 105R, 105L via the dog clutch 12 and the propeller shaft 108.

The front differential 11 includes a pair of side gears 111, a pair of pinion gears 112, a pinion gear support member 113, and a front differential case 114. The pair of side gears 111 are coupled to the pair of front drive shafts 106R, 106L. The pair of pinion gears 112 mesh with the pair of side gears 111 such that the gear axes of the pinion gears 112 extend perpendicularly to those of the side gears 111. The pinion gear support member 113 supports the pair of pinion gears 112. The front differential case 114 accommodates the pair of side gears 111, the pair of pinion gears 112, and the pinion gear support member 113.

The dog clutch 12 includes an outer rotary member 121, an inner rotary member 122, and a sleeve 123. The outer rotary member 121 rotates with the front differential case 114. The inner rotary member 122 is placed at an inner position than the outer rotary member 121 and can rotate relative to the outer rotary member 121 about the same axis as that of the outer rotary member 121. The sleeve 123 can couple the outer rotary member 121 and the inner rotary member 122 so that the outer and inner rotary members 121, 122 cannot rotate relative to each other.

Specifically, outer peripheral spline fitting portions provided on the outer peripheral surfaces of the outer and inner rotary members 121, 122 mesh with an inner peripheral spline fitting portion provided on the inner peripheral surface of the sleeve 123, whereby the outer rotary member 121 and the inner rotary member 122 are coupled by the sleeve 123 so as to rotate together. In the case where the sleeve 123 is moved in the axial direction so as to mesh with only the outer peripheral spline fitting portion of the inner rotary member 122 and not to mesh with the outer peripheral spline fitting portion of the outer rotary member 121, the outer rotary member 121 and the inner rotary member 122 are decoupled from each other and can rotate relative to each other. The sleeve 123 can be advanced or withdrawn in the axial direction by an actuator, not shown.

The propeller shaft 108 receives torque of the engine 102 from the front differential case 114 via the dog clutch 12 and transmits the torque to the driving force transmission device 1. A pinion gear 108a is placed at the end on the front wheel side of the propeller shaft 108. The pinion gear 108a meshes with a ring gear 108b. The ring gear 108b is coupled to the inner rotary member 122 of the dog clutch 12 so that the ring gear 108b cannot rotate relative to the inner rotary member 122.

The engine 102 outputs the driving force to the pair of front drive shafts 106R, 106L via the transmission 103 and the front differential 11 to drive the pair of front wheels 104R, 104L. The engine 102 outputs the driving force to the pair of rear drive shafts 107R, 107L via the transmission 103, the dog clutch 12, the propeller shaft 108, and the driving force transmission device 1 to drive the pair of rear wheels 105R, 105L.

The driving force transmission device 1 distributes the driving force received from the propeller shaft 108 to the rear drive shafts 107R, 107L so as to permit differential operation therebetween. The drive shaft 107R is coupled to the right rear wheel 105R, and the drive shaft 107L is coupled to the left rear wheel 105L.

The hydraulic unit 14 is controlled by the control device 13 to supply hydraulic oil to the driving force transmission device 1. The driving force transmission device 1 is operated by the pressure of the hydraulic oil to transmit the driving force from the propeller shaft 108 to the rear drive shafts 107R, 107L.

Figure 2:
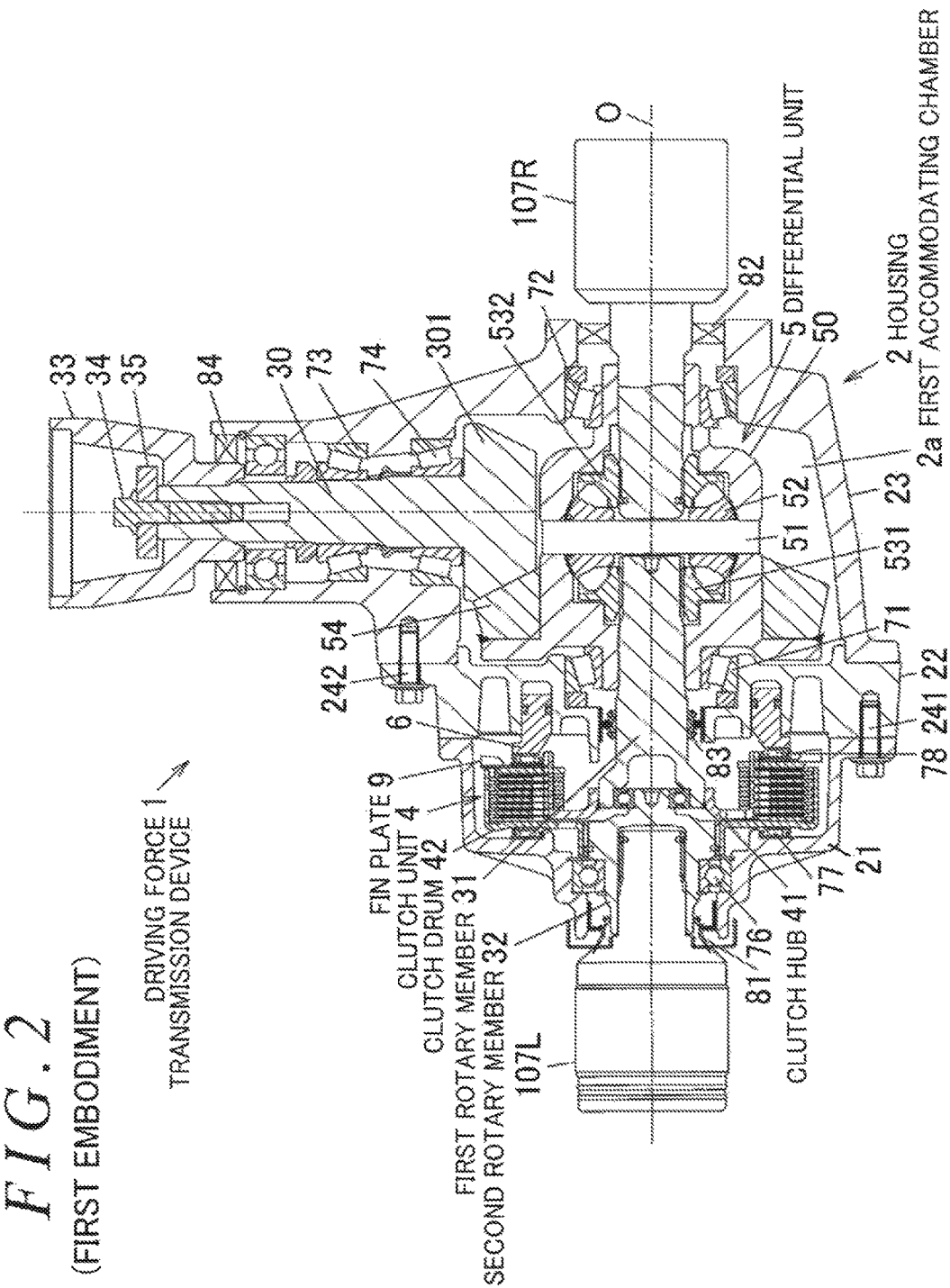
FIG. 2 is a horizontal sectional view showing an example of the configuration of the driving force transmission device.
Figure 3:
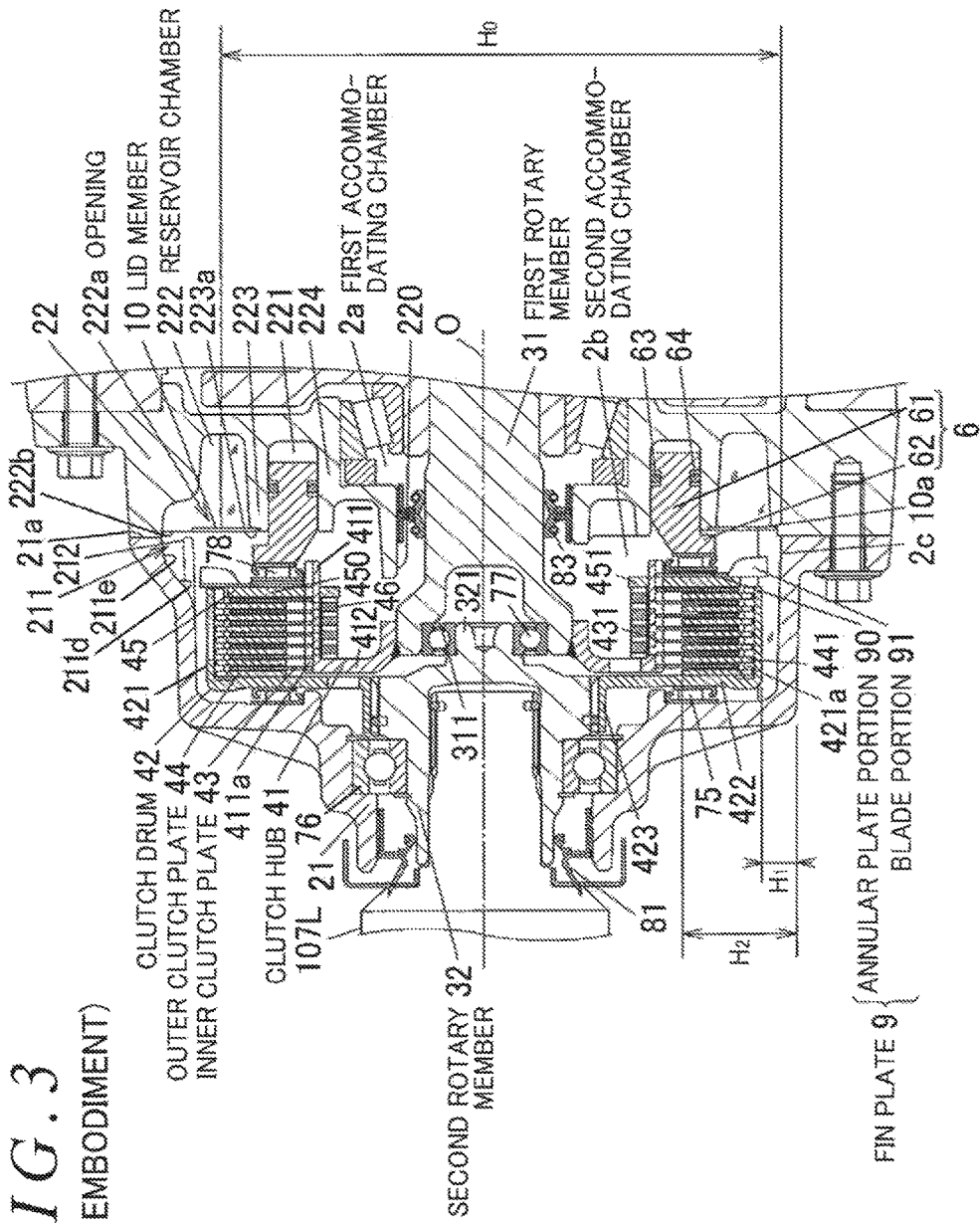
FIG. 3 is a vertical sectional view of a main part of the driving force transmission device.

FIG. 2 is a horizontal sectional view showing an example of the configuration of the driving force transmission device 1. FIG. 3 is a vertical sectional view of a main part of the driving force transmission device 1. The upper side in FIG.

3 corresponds to the upper side in the vertical direction when the driving force transmission device 1 is mounted on the four-wheel drive vehicle 100, and the lower side in FIG. 3 corresponds to the lower side in the vertical direction when the driving force transmission device 1 is mounted on the four-wheel drive vehicle 100. In the following description, the terms "upper" and "lower" refer to upper and lower in the vertical direction when the driving force transmission device 1 is mounted on the four-wheel drive vehicle 100.

As shown in FIG. 2, the driving force transmission device 1 includes a housing 2, a pinion gear shaft 30, a differential unit 5, a clutch unit 4, and a piston member 6. The housing 2 is an accommodating member formed by first to third housing members 21 to 23. The pinion gear shaft 30 is coupled to the propeller shaft 108 (shown in FIG. 1). The differential unit 5 outputs the driving force received from the pinion gear shaft 30 from a pair of side gears 531, 532 so as to permit differential operation therebetween. The clutch unit 4 adjusts the driving force that is transmitted from the differential unit 5 to the drive shaft 107L. The piston member 6 is operated by the pressure of the hydraulic oil that is supplied from the hydraulic unit 14 (shown in FIG. 1). For clarity, in the following description, the first side gear 531 refers to the left one of the pair of side gears 531, 532, and the second side gear 532 refers to the right one of the pair of side gears 531, 532.

The driving force transmission device 1 includes a first rotary member 31, a second rotary member 32, a fin plate 9, bearings 71 to 79, and seal members 81 to 84. The first rotary member 31 rotates with the first side gear 531 of the differential unit 5. The second rotary member 32 can rotate relative to the first rotary member 31 about the same rotation axis O as that of the first rotary member 31. The fin plate 9 is placed between the clutch unit 4 and the piston member 6 and rotates with the first rotary member 31 via a clutch hub 41 described below. The bearings 71 to 79 allow each part to rotate smoothly.

The housing 2 is formed by first to third housing members 21 to 23. The first housing member 21 accommodates the clutch unit 4. The third housing member 23 accommodates the pinion gear shaft 30 and the differential unit 5. The second housing member 22 is placed between the first and third housing members 21, 23. The first housing member 21 and the second housing member 22 are coupled by a plurality of bolts 241, and the second housing member 22 and the third housing member 23 are coupled by a plurality of bolts 242.

The pinion gear shaft 30 is coupled to a coupling member 33 by a bolt 34 and a washer 35 so as to rotate therewith. The propeller shaft 108 (shown in FIG. 1) is coupled to the coupling member 33. The pinion gear shaft 30 is rotatably supported by the pair of bearings 73, 74, and a gear portion 301 of the pinion gear shaft 30 meshes with a ring gear 54 of the differential unit 5.

The differential unit 5 includes a differential case 50, a pinion shaft 51, a pair of pinion gears 52, the first and second side gears 531, 532, and the ring gear 54. The pinion shaft 51 is supported by the differential case 50. The pair of pinion gears 52 are supported by the pinion shaft 51. The first and second side gears 531, 532 mesh with the pair of pinion gears 52 such that the axes of the first and second side gears 531, 532 extend perpendicularly to those of the pair of pinion gears 52. The ring gear 54 rotates with the differential case 50. The differential case 50 is rotatably supported at its both ends in the lateral direction of the four-wheel drive vehicle 100 by the bearings 71, 72.

The ring gear 54 of the differential unit 5 meshes with the gear portion 301 of the pinion gear shaft 30. The differential unit 5 distributes the driving force transmitted from the pinion gear shaft 30 to the ring gear 54, to the rear drive shafts 107R, 107L via the pair of pinion gears 52 and the first and second side gears 531, 532.

Differential oil, not shown, lubricates the ring gear 54 of the differential unit 5 and the gear portion 301 of the pinion gear shaft 30 which mesh with each other, and also lubricates the pair of pinion gears 52 and the first and second side gears 531, 532 which mesh with each other. The differential oil has viscosity suitable for lubrication of the meshing gears and is enclosed in a first accommodating chamber 2a of the housing 2 by the seal members 82 to 84. The first accommodating chamber 2a accommodates the pinion gear shaft 30 and the differential unit 5.

The seal member 82 is fixed to the inner surface of an insertion hole formed in the third housing member 23. This insertion hole is a hole through which the rear drive shaft 107R is inserted. The seal member 83 is fixed to the inner surface of the second housing member 22 which faces the outer peripheral surface of the first rotary member 31. The seal member 84 is fixed to the inner surface of the third housing member 23 which faces the outer surface of the coupling member 33.

The first rotary member 31 that transmits the driving force to the clutch unit 4 is coupled to the first side gear 531 so as to rotate therewith. The drive shaft 107R is coupled to the second side gear 532 so as to rotate therewith. The second rotary member 32 is coupled to the drive shaft 107L so as to rotate therewith.

The clutch hub 41 having the shape of a bottomed cylinder is coupled to the end of the first rotary member 31 which is located on the drive shaft 107L side. A clutch drum 42 having the shape of a bottomed cylinder with a larger diameter than that of the clutch hub 41 is coupled to the opposite end of the second rotary member 32 from the drive shaft 107L.

When the four-wheel drive vehicle 100 shown in FIG. 1 is in the four-wheel drive mode in which the driving force of the engine 202 is transmitted to the front wheels 104R, 104L and the rear wheels 105R, 105L, the dog clutch 12 is coupled, and the clutch unit 4 is operated by the hydraulic oil supplied from the hydraulic unit 14 so that torque can be transmitted. The driving force of the engine 102 is thus transmitted to the front drive shafts 106R, 106L via the front differential 11 and is further transmitted to the rear drive shafts 107R, 107L via the front differential case 114, the dog clutch 12, the propeller shaft 108, and the driving force transmission device 1.

When the four-wheel drive vehicle 100 is in the two-wheel drive mode in which the driving force of the engine 102 is transmitted only to the front wheels 104R, 104L, the dog clutch 12 is decoupled and the clutch unit 4 of the driving force transmission device 1 is disengaged so that no torque is transmitted. The propeller shaft 108, the pinion gear shaft 30, the ring gear 54 of the differential unit 5, the pinion shaft 51, and the differential case 50 are therefore not rotated during traveling in the two-wheel drive mode, whereby stirring resistance of lubricant L and sliding resistance of each part are reduced, and fuel economy of the four-wheel drive vehicle 100 can be improved.

When the four-wheel drive vehicle 100 is traveling in the two-wheel drive mode, the second side gear 532 of the differential unit 5 rotates with the drive shaft 107R, and the first side gear 531 rotates in the opposite direction to that of the second side gear 532 due to rotation of the pinion gear 52 (rotation about the rotation center of the pinion shaft 51). The first rotary member 31 coupled to the first side gear 531 and the second rotary member 32 coupled to the drive shaft 107L thus rotate in the opposite directions, and outer clutch plates 44 and inner clutch plates 43, described below, of the clutch unit 4 rotate in the opposite directions accordingly.

If drag torque due to viscosity of the lubricant L that is present between the outer and inner clutch plates 44, 43 increases, rotation of the propeller shaft 108 etc. may not be satisfactorily stopped during traveling in the two-wheel drive mode, which may affect improvement in fuel economy. In the driving force transmission device 1 of the present embodiment, the amount of lubricant L that is present between the outer and inner clutch plates 44, 43 during traveling in the two-wheel drive mode is reduced in order to reduce drag torque in the clutch unit 4. This configuration will be described in detail below.

As shown in FIG. 3, the clutch unit 4 includes the clutch hub 41, the clutch drum 42, the plurality of inner clutch plates 43, the plurality of outer clutch plates 44, a pressing member 45, and an elastic member 46. The clutch hub 41 rotates with the first rotary member 31. The clutch drum 42 rotates with the second rotary member 32. The plurality of inner clutch plates 43 are spline-fitted on the clutch hub 41, and the plurality of outer clutch plates 44 are spline-fitted in the clutch drum 42. The pressing member 45 is coupled to the clutch hub 41 so as to rotate therewith. The elastic member 46 biases the pressing member 45. The inner clutch plates 43 correspond to the first clutch plate in the present invention, and the outer clutch plates 44 correspond to the second clutch plate in the present invention.

The plurality of inner clutch plates 43 and the plurality of outer clutch plates 44 are alternately arranged in a direction parallel to the rotation axis O of the first rotary member 31 and the second rotary member 32. As shown in FIG. 3, each inner clutch plate 43 has a plurality of engagement projections 431 at its inner peripheral end, and each outer clutch plate 44 has a plurality of engagement projections 441 at its outer peripheral ends.

The clutch hub 41 is a single-piece member formed by a cylindrical portion 411 and a joint portion 412. The cylindrical portion 411 has a spline fitting portion 411a formed in its outer peripheral surface. The spline fitting portion 411a is formed by a plurality of spline projections extending parallel to the rotation axis O. The joint portion 412 extends inward from one end of the cylindrical portion 411 and is coupled to the first rotary member 31. In the present embodiment, the joint portion 412 of the clutch hub 41 is connected to the outer peripheral surface of the first rotary member 31 by welding. However, the present invention is not limited to this. For example, the joint portion 412 may be coupled to the first rotary member 31 by spline fitting.

The plurality of engagement projections 431 of each inner clutch plate 43 engage with the spline fitting portion 411a of the cylindrical portion 411 of the clutch hub 41, so that the inner clutch plates 43 cannot rotate relative to the clutch hub 41 but can move relative to the clutch hub 41 in the axial direction.

The cylindrical portion 411 of the clutch hub 41 has a plurality of grooves in its tip end, namely the opposite axial end from the joint portion 412, and a plurality of inward projections 451 of the pressing member 45 are inserted through the plurality of grooves. The inward projections 451 engage with the grooves, so that the pressing member 45 cannot rotate relative to the clutch hub 41 but can move relative to the clutch hub 41 in the axial direction. The tip ends of the inward projections 451 project inward (toward the first rotary member 31) beyond the inner peripheral surface of the cylindrical portion 411.

The elastic member 46 is placed between the joint portion 412 of the clutch hub 41 and the inward projections 451 of the pressing member 45 which project inward beyond the inner peripheral surface of the cylindrical portion 411. The elastic member 46 is mounted in a compressed state in a direction parallel to the rotation axis O, and elastically biases the pressing member 45 in such a direction that the pressing member 45 is separated from the joint portion 412 of the clutch hub 41. The pressing member 45 is a single-piece member formed by an annular pressing portion 450 and the plurality of inward projections 451. The pressing portion 450 is located on the outer periphery of the cylindrical portion 411 of the clutch hub 41, and the plurality of inward projections 451 protrude inward beyond the inner peripheral surface of the pressing portion 450.

The clutch drum 42 is a single-piece member formed by a cylindrical portion 421, a bottom wall portion 422, and a joint portion 423. The cylindrical portion 421 has a spline fitting portion 421a formed in its inner peripheral surface. The spline fitting portion 421a is formed by a plurality of spline projections extending parallel to the rotation axis O. The bottom wall portion 422 extends inward from one end of the cylindrical portion 421. The joint portion 423 extends along the outer peripheral surface of the second rotary member 32 from the inner peripheral end of the bottom wall portion 422. The cylindrical portion 421 and the bottom wall portion 422 of the clutch drum 42 together have the shape of a bottomed cylinder. The inner peripheral surface of the cylindrical portion 421 of the clutch drum 42 faces the outer peripheral surface of the cylindrical portion 411 of the clutch hub 41.

The plurality of engagement projections 441 of each outer clutch plate 44 engage with the spline fitting portion 421a of the cylindrical portion 421 of the clutch drum 42, so that the outer clutch plates 44 cannot rotate relative to the clutch drum 42 but can move relative to the clutch drum 42 in the axial direction. In the present embodiment, the joint portion 423 of the clutch drum 42 is coupled to the outer peripheral surface of the second rotary member 32 by spline fitting. However, the present invention is not limited to this. For example, the joint portion 423 may be connected to the second rotary member 32 by welding.

The plurality of inner clutch plates 43 and the plurality of outer clutch plates 44 are placed between the bottom wall portion 422 of the clutch drum 42 and the pressing portion 450 of the pressing member 45. The bearing 75 is placed between the bottom wall portion 422 of the clutch drum 42 and the inner surface of the first housing member 21. The bearing 75 is a thrust roller bearing and restricts axial movement of the clutch drum 42.

When the pressing force is applied from the pressing portion 450 of the pressing member 45 to the plurality of inner clutch plates 43 and the plurality of outer clutch plates 44, the inner clutch plates 43 and the outer clutch plates 44 frictionally contact each other to transmit the driving force between the clutch hub 41 and the clutch drum 42. That is, the driving force is transmitted from the second rotary member 32 to the first rotary member 31 when the plurality of inner clutch plates 43 and the plurality of outer clutch plates 44 frictionally contact each other by the pressing force from the pressing member 45. The transmission of the driving force between the second rotary member 32 and the first rotary member 31 is cut off when no pressing force is applied from the pressing member 45 to the plurality of inner clutch plates 43 and the plurality of outer clutch plates 44.

The lubricant L lubricates the plurality of inner clutch plates 43 and the plurality of outer clutch plates 44. The lubricant L thus restrains wear of the inner clutch plates 43 and the outer clutch plates 44. The lubricant L is restrained from leaking from a second accommodating chamber 2b of the housing 2 by the seal member 81 placed between the outer peripheral surface of the second rotary member 32 and the inner surface of the first housing member 21. The second accommodating chamber 2b accommodates the clutch hub 41 and the clutch drum 42. The lubricant L in the second accommodating chamber 2b and the differential oil in the first accommodating chamber 2a are separated from each other by the seal member 83. The lubricant L in the second accommodating chamber 2b is less viscous than the differential oil in the first accommodating chamber 2a. The second accommodating chamber 2b corresponds to the accommodating chamber in the present invention.

The second rotary member 32 is supported by the bearing 76 placed next to the seal member 81 so that the second rotary member 32 can rotate relative to the first housing member 21. The second rotary member 32 has a boss portion 321 at its end located on the first rotary member 31 side. The bearing 77 placed on the outer periphery of the boss portion 321 is fitted in a recess 311 formed in the first rotary member 31. The first rotary member 31 and the second rotary member 32 can thus rotate relative to each other about the same axis.

The second housing member 22 has an insertion hole 220 through which the first rotary member 31 is inserted, a cylinder chamber 221 to which the hydraulic oil is supplied from the hydraulic unit 14, and a reservoir chamber 222 that stores the lubricant L. The hydraulic oil is supplied to the cylinder chamber 221 through a hydraulic oil supply hole, not shown, formed in the second housing member 22.

The cylinder chamber 221 and the reservoir chamber 222 have an annular shape and are located on the outer peripheral side of the insertion hole 220 (see FIG. 5 described later). The cylinder chamber 221 is sandwiched between an outer partition wall 223 and an inner partition wall 224. The outer partition wall 223 separates the cylinder chamber 221 from the reservoir chamber 222, and the inner partition wall 224 is located at an inner position than the outer partition wall 223. Both the cylinder chamber 221 and the reservoir chamber 222 open to the second accommodating chamber 2b.

A part of an opening 222a of the reservoir chamber 222 is closed by an annular lid member 10. The lid member 10 is fitted in an annular fitting groove 223a formed in the tip end of the outer partition wall 223. The reservoir chamber 222 has an inlet port 222b for the lubricant L at a position above the opening 222a. The inlet port 222b is not closed by the lid member 10. The reservoir chamber 222 is formed such that a part of the reservoir chamber 222 which corresponds to the inlet port 222b protrudes further outward in the radial direction than the range closed by the lid member 10. The reservoir chamber 222 is located so as to face the second accommodating chamber 2b along the rotation axis O with the lid member 10 interposed therebetween.

The piston member 6 is a single-piece member formed by a supported portion 61 and a pressing portion 62. The supported portion 61 is accommodated in the cylinder chamber 221 and is supported so that the supported portion 61 can move in the direction of the rotation axis O. The pressing portion 62 is continuous with the supported portion 61 along the rotation axis O and is exposed from the cylinder chamber 221 to the second accommodating chamber 2b.

The supported portion 61 of the piston member 6 has an annular groove in each of its inner and outer peripheral surfaces. O-rings 63, 64 are accommodated in the annular grooves. The O-rings 63, 64 function as seal members that prevent the hydraulic oil supplied from the hydraulic unit 14 from leaking into the second accommodating chamber 2b. The pressing portion 62 of the piston member 6 faces the fin plate 9 at a position outside the cylinder chamber 221. The bearing 78 is placed between the pressing portion 62 of the piston member 6 and the pressing member 45. The bearing 78 is a thrust roller bearing.

When the hydraulic oil is supplied from the hydraulic unit 14 to the cylinder chamber 221, the supported portion 61 is subjected to the pressure of the hydraulic oil and the piston member 6 is moved toward the clutch unit 4. When the pressure of the hydraulic oil in the cylinder chamber 221 decreases, the piston member 6 is subjected to the biasing force (restoring force) of the elastic member 46 via the pressing member 45 and the bearing 78 and is moved to the opposite side from the clutch unit 4.

The fin plate 9 is placed between the pressing member 45 and the thrust roller bearing 78 and rotates with the clutch hub 41. The fin plate 9 rotates with the clutch hub 41 to feed the lubricant L in the second accommodating chamber 2b to the reservoir chamber 222. The fin plate 9 is a single-piece member formed by an annular plate portion 90 and blade portions 91 formed outside the annular plate portion 90 in the radial direction (see the left half of FIG. 6). The annular plate portion 90 has a plurality of engagement projections 90l that engage with the spline fitting portion 411a of the cylindrical portion 411 of the clutch hub 41. The fin plate 9 is thus coupled to the clutch hub 41 so that it cannot rotate relative to the clutch hub 41 but can move relative to the clutch hub 41 in the axial direction. The fin plate 9 corresponds to the lubricant feed member in the present invention.

When the driving force transmission device 1 is in operation, the annular plate portion 90 of the fin plate 9 is pressed by the pressing portion 62 of the piston member 6 via the bearing 78 and is thus subjected to the pressing force in the direction of the rotation axis O. The blade portions 91 of the fin plate 9 have a pumping function to scoop up the lubricant L staying in the lower part of the second accommodating chamber 2b. The structure of the blade portions 91 of the fin plate 9 will be described in detail later.

The first housing member 21 has an oil receiving portion 211 that collects the lubricant L scooped up by the fin plate 9. The oil receiving portion 211 is formed in a part of the first housing member 21 which faces the blade portions 91 of the fin plate 9 in the direction of the rotation axis O of the first housing member 21. The oil receiving portion 211 is formed at one circumferential position of the first housing member 21 and convexly protrudes outward in the radial direction (see FIG. 4 described later).

The oil receiving portion 211 is formed so that its outer surface gradually extends outward in the radial direction from the first housing member 21 toward the second housing member 22 in the direction of the rotation axis O. The oil receiving portion 211 is separated from the second accommodating chamber 2b by a partition wall 212 (see FIG. 4) facing the inner surface of the oil receiving portion 211 and extending along the rotation axis O. The partition wall 212 is formed such that its tip end on the second housing member 22 side extends at least to a plane parallel to a facing plane 21a where the first housing member 21 faces the second housing member 22 along the rotation axis O. In FIG. 3, the partition wall 212 is shown by a long dashed double-short dashed line. The oil receiving portion 211 corresponds to the collecting chamber in the present invention.

When the clutch hub 41 is rotated, the fin plate 9 is rotated accordingly to scoop up the lubricant L. This lubricant L is collected by the oil receiving portion 211 described below. The lubricant L that overflows the oil receiving portion 211 is stored in the reservoir chamber 222 through the inlet port 222b. When the amount of lubricant L in the second accommodating chamber 2b decreases to such a degree that the lubricant L can no longer be scooped up by the fin plate 9, the level of the lubricant L in the reservoir chamber 222 and the level of the lubricant L in the second accommodating chamber 2b become substantially constant. This state is hereinafter referred to as the first steady state.

When the clutch hub 41 and the fin plate 9 stops rotating, the level of the lubricant L in the reservoir chamber 222 and the level of the lubricant L in the second accommodating chamber 2b become the same. This state is hereinafter referred to as the second steady state.

In FIG. 3, $H_0$ represents the level of the lubricant L in the reservoir chamber 222 in the first steady state, and $H_1$ represents the level of the lubricant L in the second accommodating chamber 2b in the first steady state. These levels $H_0$, $H_1$ refer to the height from the lowest point 2c of the second accommodating chamber 2b in the vertical direction to the surfaces of the lubricant L in the reservoir chamber 222 and the second accommodating chamber 2b, respectively.

As shown in FIG. 3, the level $H_0$ of the lubricant L in the reservoir chamber 222 in the first steady state is higher than the level $H_1$ of the lubricant L in the second accommodating chamber 2b. That is, the reservoir chamber 222 can store the lubricant L up to the level $H_0$ higher than the level $H_1$ of the lubricant L in the second accommodating chamber 2b.

In FIG. 3, $H_2$ represents the level of the lubricant L in the second accommodating chamber 2b and the reservoir chamber 222 in the second steady state. This level $H_2$ is such a level that the inner peripheral ends of the outer clutch plates 44 are soaked in the lower part of the second accommodating chamber 2b. The level $H_2$ is lower than the level $H_0$ of the lubricant L in the reservoir chamber 222 in the first steady state, and higher than the level $H_1$ of the lubricant L in the second accommodating chamber 2b. The inlet port 222b of the reservoir chamber 222 is located higher than the level $H_2$ of the lubricant L in the second accommodating chamber 2b. The lubricant L staying in the second accommodating chamber 2b therefore does not flow into the reservoir chamber 222 in the second steady state due to its own weight.

In the second steady state, the lubricant L is present between the plurality of inner clutch plates 43 and the plurality of outer clutch plates 44. This restrains wear from being caused by frictional sliding between the inner and outer clutch plates 43, 44 even if the clutch hub 41 and the clutch drum 42 rotate relative to each other while receiving the pressing force from the pressing member 45.

Figure 4:
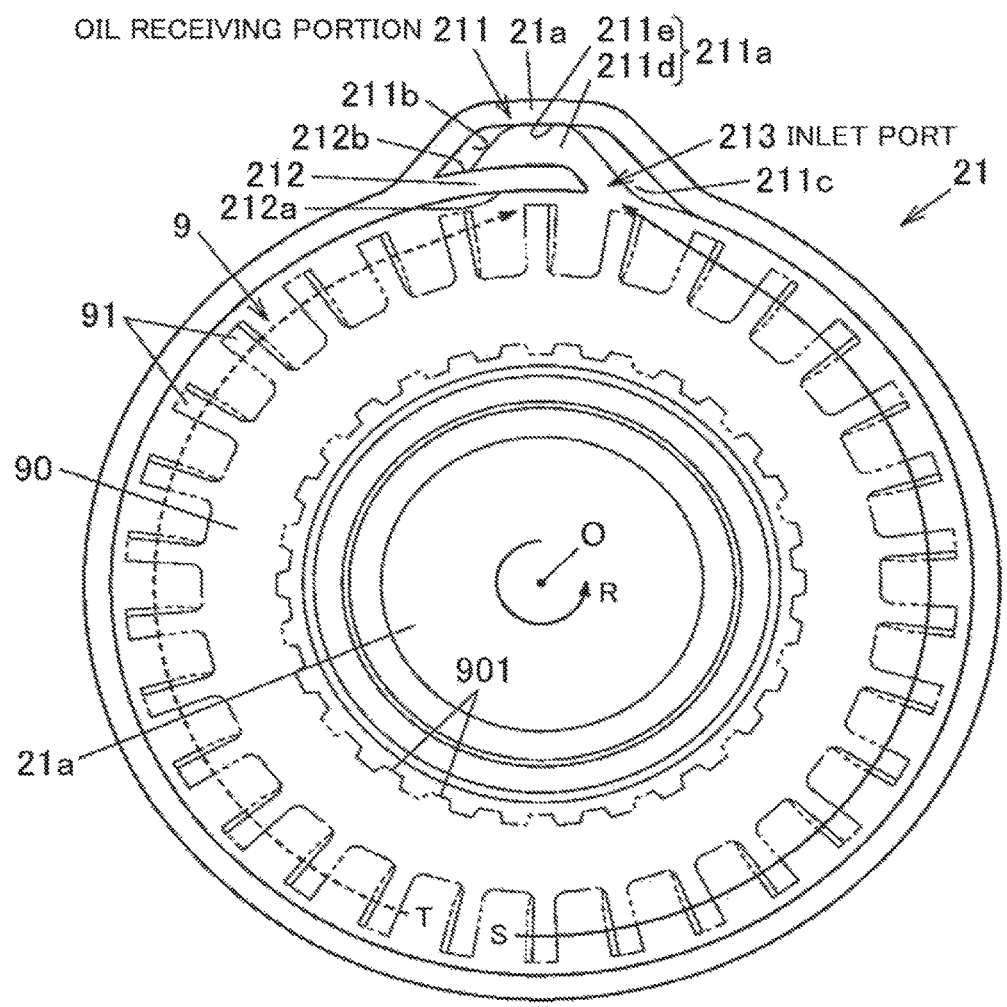
FIG. 4 is a plan view of a first housing member as viewed from the second housing member side.

FIG. 4 is a plan view of the first housing member 21 as viewed from the second housing member 22 side along the rotation axis O. In FIG. 4, the fin plate 9 is shown by a long dashed double-short dashed line.

In FIG. 4, the clutch hub 41 and the fin plate 9 rotate counterclockwise (direction shown by an arrow R) when the four-wheel drive vehicle 100 travels forward in the four-wheel drive mode.

As shown in FIG. 4, the oil receiving portion 211 is formed on the outer periphery of the partition wall 212 having an inner surface 212a that faces the blade portions 91 of the fin plate 9. That is, the oil receiving portion 211 is separated by the partition wall 212 from the space where the clutch unit 4 and the fin plate 9 are accommodated. In the present embodiment, the partition wall 212 has an arc shape extending in the circumferential direction of the first housing member 21. The oil receiving portion 211 opens to the second housing member 22 side (shown in FIG. 3) and communicates with an opening 220a of the reservoir chamber 222 of the second housing member 22 along the rotation axis O.

The inner surface of the oil receiving portion 211 is formed by an upper surface 211a, first and second side surfaces 211b, 211c facing each other, and an outer surface 212b, or the opposite end face of the partition wall 212 from the inner surface 212a. The first side surface 211b is a side surface located on the partition wall 212 side, and the second side surface 211c faces each of the first side surface 211b and the partition wall 212 with clearance therebetween. An inlet port 213 through which the lubricant L scooped up by the fin plate 9 is introduced into the oil receiving portion 211 is formed between the partition wall 212 and the second side surface 211c. The inlet port 213 is located radially outside the blade portions 91 of the fin plate 9 in the first housing member 21.

The upper surface 211a is a surface that faces the fin plate 9 located below the oil receiving portion 211. The upper surface 211a has a tilted surface 211d and a parallel surface 211e (see FIG. 3). The tilted surface 211d is tilted upward closer to the second housing member 22 in the direction of the rotation axis O. The parallel surface 211e extends parallel to the rotation axis O.

The distance between the first and second side surfaces 211b, 211c increases closer to the second housing member 22 in the direction of the rotation axis O. The opening width of the oil receiving portion 211 therefore gradually decreases farther away from the second housing member 22 in the direction of the rotation axis O, as viewed from the second housing member 22. The capacity of the oil receiving portion 211 is thus limited, and the time to overflow of the lubricant L collected by the oil receiving portion 211 is reduced. The lubricant L collected by the oil receiving portion 211 can therefore be made to flow into the reservoir chamber 222 smoothly.

When the fin plate 9 rotates in the counterclockwise direction (direction shown by the arrow R) while the four-wheel drive vehicle 100 is in the two-wheel drive mode, a lubricant flow (flow S in FIG. 4) is formed in the same direction as the rotational direction of the fin plate 9 by the centrifugal force that is generated by the rotation of the fin plate 9. The lubricant L flows along the inner surface of the first housing member 21 and is collected by the oil receiving portion 211 through the inlet port 213 along the flow S. The lubricant L scooped up by the blade portions 91 of the fin plate 9 is also collected by the oil receiving portion 211 through the inlet port 213. In the present embodiment, the lubricant L is thus collected by the oil receiving portion 211 by the pumping function of the fin plate 9 to scoop up the lubricant L in the second accommodating chamber 2b into the oil receiving portion 211.

Figure 5:
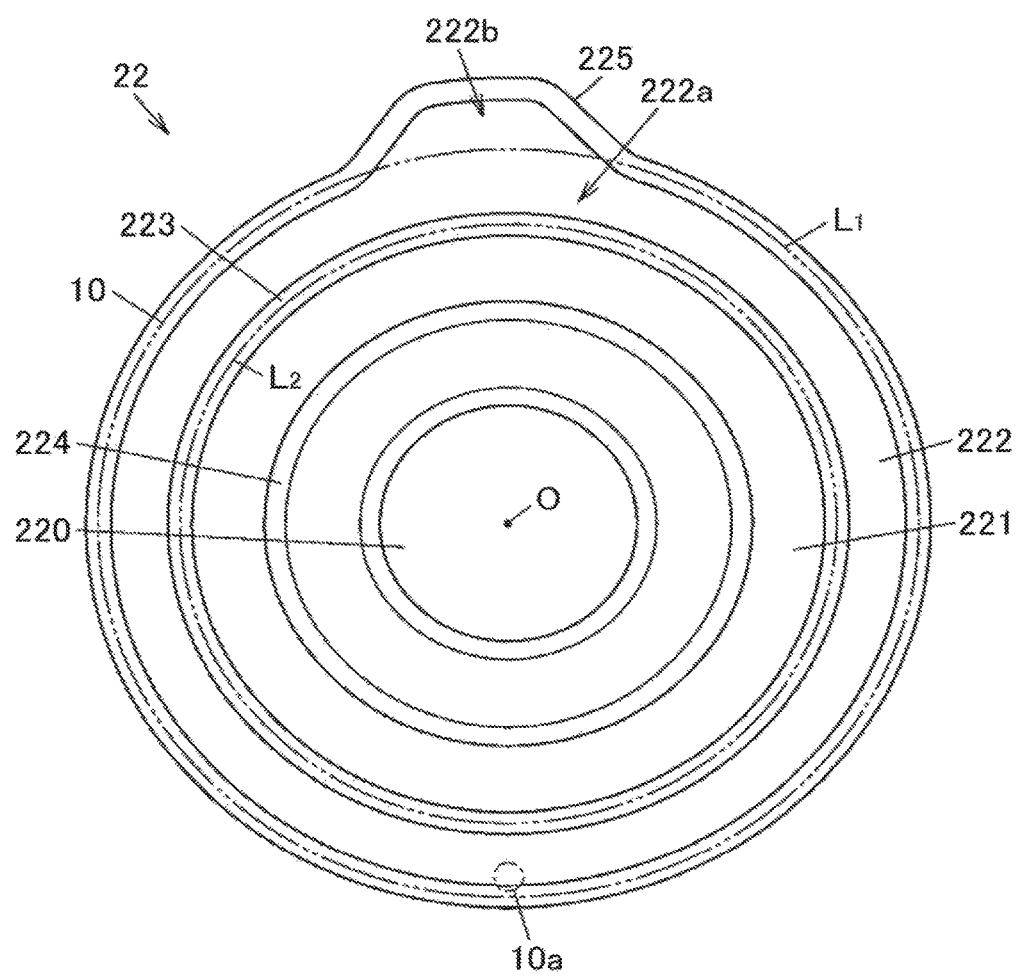
FIG. 5 is a plan view of the second housing member as viewed from the first housing member side.

FIG. 5 is a plan view of the second housing member 22 as viewed from the first housing member 21 side along the rotation axis O. In FIG. 5, the outer and inner edges of the lid member 10 are shown by long dashed double-short dashed lines $L_1$, $L_2$. That is, the region of the second housing member 22 which is located between the long dashed double-short dashed lines $L_1$, $L_2$ is covered by the lid member 10.

As shown in FIG. 5, the outer peripheral surface of the second housing member 22 protrudes at one position in the circumferential direction to form a protruding portion 225 corresponding to the oil receiving portion 211 of the first housing member 21. The inlet port 222b described above is formed inside the protruding portion 225.

The reservoir chamber 222 and the cylinder chamber 221 are separated from each other by the annular outer partition wall 223. The cylinder chamber 221 and the reservoir chamber 222, and the inner partition wall 224 and the outer partition wall 223 are formed concentrically about the rotation axis O. The cylinder chamber 221 is formed between the outer partition wall 223 and the inner partition wall 224, and the reservoir chamber 222 is formed on the outer periphery of the outer partition wall 223. The lubricant L that has flowed into the reservoir chamber 222 through the inlet port 222b flows along the outer peripheral surface of the outer partition wall 223 and is discharged into the second accommodating chamber 2b through a circular flow hole 10a of the lid member 10. The flow hole 10a extends through the lid member 10 in the rotation axis O. The shape of the flow hole 10a is not limited to this. For example, the flow hole 10a may have an elliptical shape or a rectangular shape.

Figure 6:
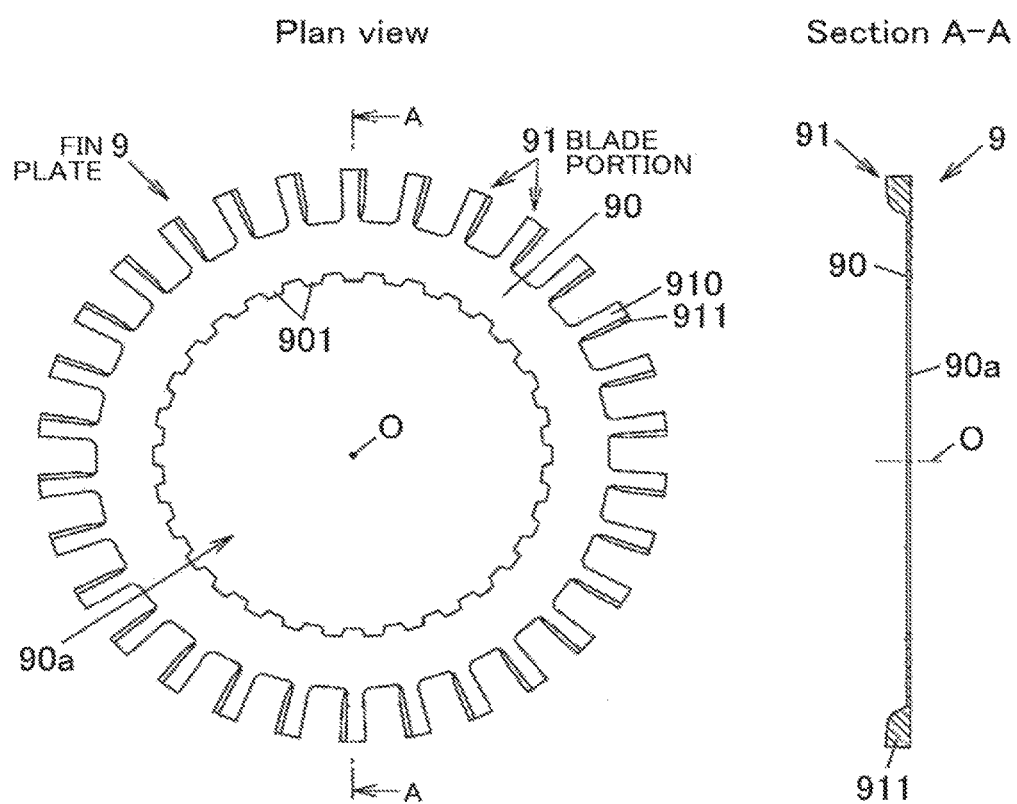
FIG. 6 shows an example of the configuration of a fin plate, a plan view of the fin plate being shown in the left half of FIG. 6, and a sectional view of the fin plate taken along a line A-A in the plan view being shown in the right half of FIG. 6.

FIG. 6 shows an example of the configuration of the fin plate 9. A plan view of the fin plate 9 is shown in the left half of FIG. 6, and a sectional view of the fin plate 9 taken along a line A-A in the plan view is shown in the right half of FIG. 6. FIG. 7 shows an example of the configuration of the blade portion 91. An enlarged perspective view of the blade portion 91 is shown in the left half of FIG. 7, and a side view of the blade portion 91 as viewed from the outside inward in the radial direction is shown in the right half of FIG. 7.

As shown in the left half of FIG. 6, the fin plate 9 is an annular plate-like member. As described above, the fin plate 9 is a single-piece member formed by the annular plate portion 90 and the plurality of (in the present embodiment, 30) blade portions 91. The annular plate portion 90 has an insertion hole 90a through which the cylindrical portion 411 (shown in FIG. 3) of the clutch hub 41 is inserted. The plurality of engagement projections 90l of the annular plate portion 90 are arranged at regular intervals in the circumferential direction. In the present embodiment, the fin plate 9 is a single-piece member formed by, e.g., injection molding etc. using a synthetic resin. The material of the fin plate 9 and the method for producing the fin plate 9 are not limited to this. For example, the fin plate 9 may be produced by pressing a sheet metal etc.

The blade portions 91 extend outward in the radial direction from the outer peripheral end of the annular plate portion 90, and have a substantially rectangular shape as viewed along the rotation axis O. The plurality of blade portions 91 are arranged at regular intervals in the circumferential direction. As shown in the left half of FIG. 6, each blade portion 91 has a scoop-up plate 911. The scoop-up plate 911 is formed on the side of the annular plate portion 90, which faces the second housing member 22 (shown in FIG. 3) in the thickness direction of the annular plate portion 90 (direction along the rotation axis O), and stands toward the second housing member 22.

As shown in the left half of FIG. 7, each blade portion 91 is integrally formed by a flat plate 910 and the scoop-up plate 911. The flat plate 910 extends parallel to the radial direction from the outer peripheral end of the annular plate portion 90. The scoop-up plate 911 stands along the rotation axis O from an upper surface 910a of the flat plate 910 (the surface facing the lid member 10 shown in FIG. 3). As shown in the right half of FIG. 7, the scoop-up plate 911 stands perpendicularly from the left side of the upper surface 910a of the flat plate 910. The right surface (right surface in the right half of FIG. 7) of the scoop-up plate 911 serves as a scoop-up surface 911a that scoops up the lubricant L when the fin plate 9 rotates in the counterclockwise direction in the left half of FIG. 6.

As shown in the right half of FIG. 7, in the present embodiment, the angle between the flat plate 910 and the scoop-up plate 911 of the blade portion 91 is 90 degrees. That is, the upper surface 910a of the flat plate 910 extends perpendicularly to the scoop-up surface 911a of the scoop-up plate 911. However, the angle between the flat plate 910 and the scoop-up plate 911 of the blade portion 91 is not limited to this. For example, the scoop-up plate 911 may be tilted at an obtuse angle with respect to the flat plate 910. The amount of lubricant L that is scooped up by each blade portion 910 can be adjusted by setting the tilt angle between the flat plate 910 and the scoop-up plate 911 of the blade portion 91 as appropriate.

Figure 8A:
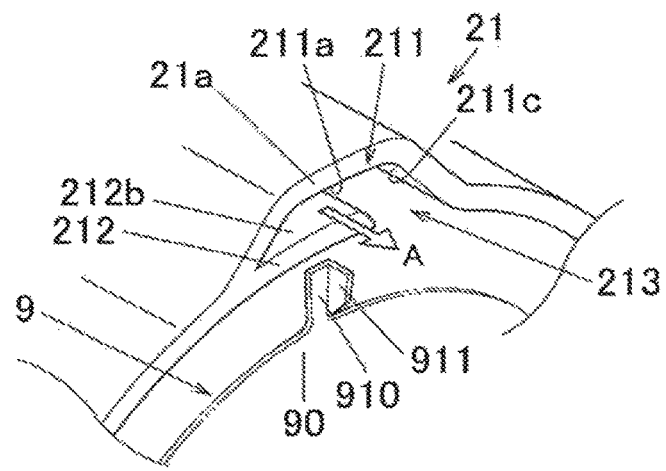
FIG. 8A is a perspective view of an outlet port of a first housing member.
Figure 8B:
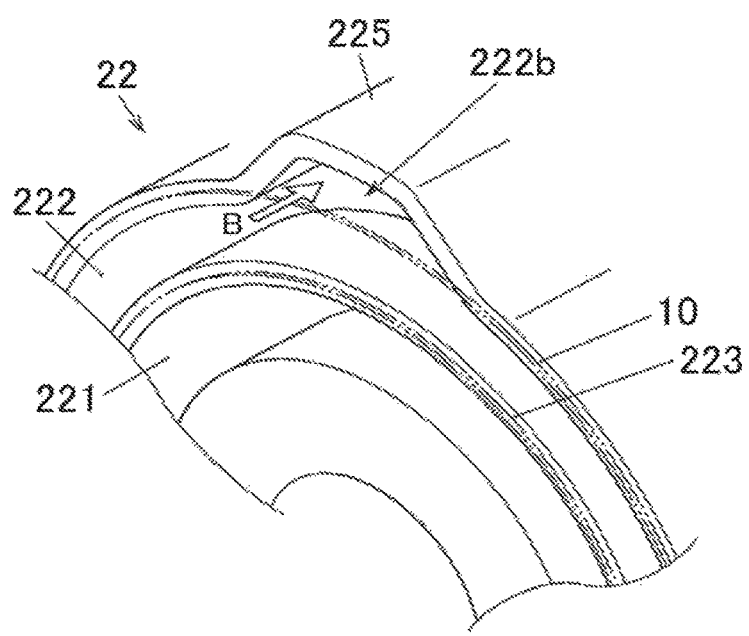
FIG. 8B is a perspective view of an inlet port of the second housing member.
Figure 9:
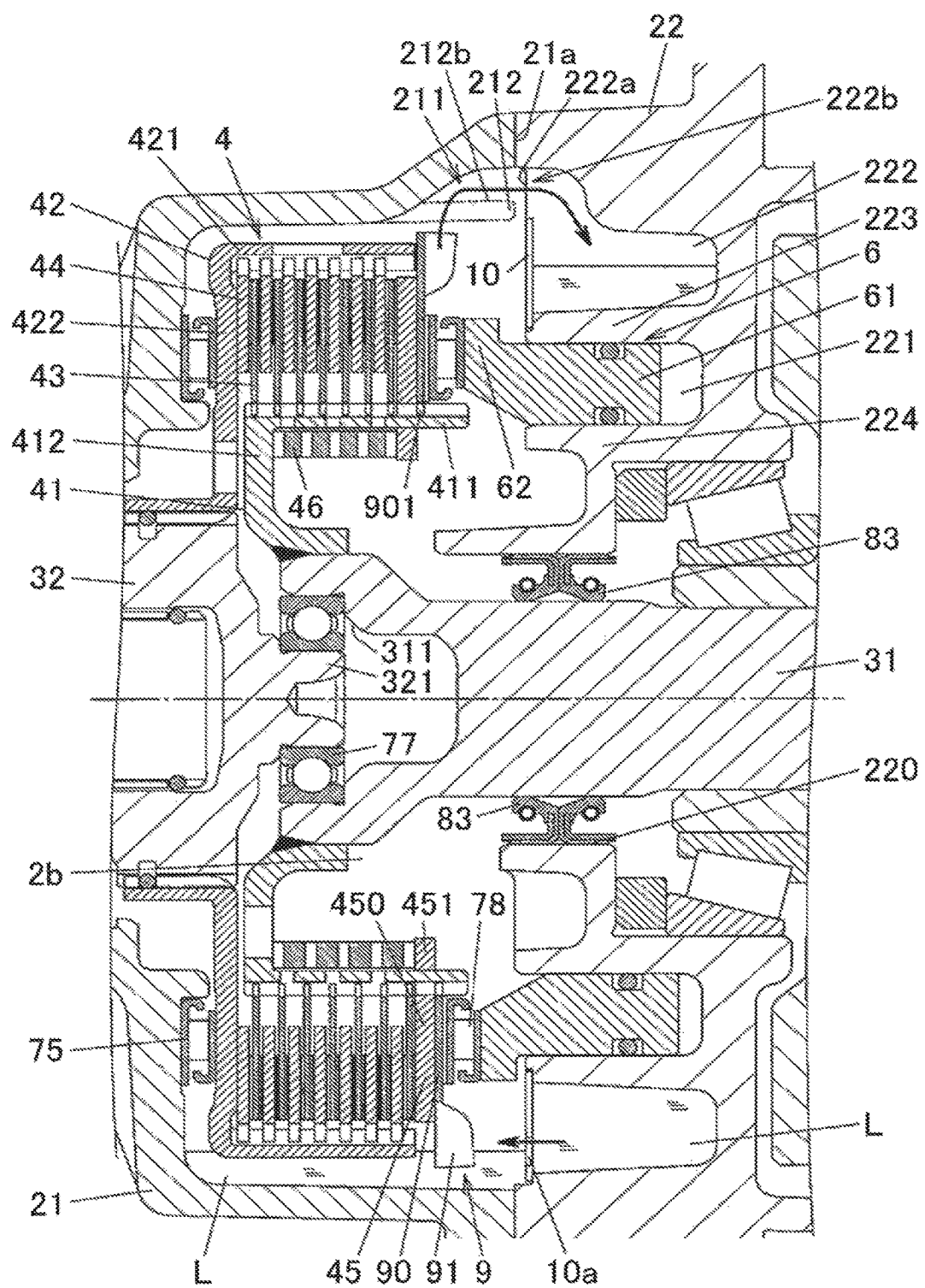
FIG. 9 is a partial enlarged sectional view of the driving force transmission device.

The driving force transmission device 1 having the configuration described above with reference to FIGS. 1 to 7 operates as follows in order to reduce drag torque. The operation of the driving force transmission device 1 will be described with reference to FIG. 4 described above and FIGS. 8A, 8B, and 9. FIGS. 8A and 8B illustrate how the lubricant L collected by the oil receiving portion 211 flows into the reservoir chamber 222. FIG. 8A is an enlarged perspective view of the oil receiving portion 211 of the first housing member 21, and FIG. 8B is an enlarged perspective view of the reservoir chamber 222 of the second housing member 22. FIG. 9 is an enlarged sectional view of a main part of the driving force transmission device 1, illustrating the flow of the lubricant L. In FIG. 8, the lid member 10 is shown by long dashed double-short dashed lines.

As shown in FIG. 4, when the four-wheel drive vehicle 100 is in the two-wheel drive mode, the fin plate 9 rotates in the counterclockwise direction (direction shown by the arrow R). At this time, the lubricant L is subjected to the centrifugal force generated by the rotation of the fin plate 9 and the flow S of the lubricant L is formed accordingly. The lubricant L thus flows along the inner surfaces of the oil receiving portion 211 on which the partition wall 212 is not formed (the second side surface 211c and the upper surface 211a) and flows into the oil receiving portion 211. The lubricant L scooped up by the blade portions 91 of the fin plate 9 is scattered, and a part of the scattered lubricant L enters the oil receiving portion 211 through the inlet port 213 toward the first side surface 211b. The lubricant L is thus collected by the oil receiving portion 211.

As shown in FIGS. 8A, 8B, and 9, when the amount of collected lubricant L becomes larger than the capacity of the oil receiving portion 211, the lubricant L flows along the outer surface 212b of the partition wall 212 in the direction shown by an arrow A (direction along the rotation axis O) and flows through the inlet port 222b in the direction shown by an arrow B (direction along the rotation axis O) into the reservoir chamber 222 of the second housing member 22.

The lubricant L stored in the reservoir chamber 222 flows along the outer peripheral surface of the outer partition wall 223 and is discharged into the second accommodating chamber 2b through the flow hole 10a of the lid member 10. The opening area of the flow hole 10a of the lid member 10 is set so that the amount of lubricant L that is discharged into the second accommodating chamber 2b is smaller than that of lubricant L that is supplied to the reservoir chamber 222 when the four-wheel drive vehicle 100 is in the two-wheel drive mode.

As described above, in the present embodiment, the lubricant L in the second accommodating chamber 2b is fed to the reservoir chamber 222 by the force by which the lubricant L is scooped up when the fin plate 9 is rotated. As the lubricant L is stored in the reservoir chamber 222, the amount of lubricant L in the second accommodating chamber 2b decreases accordingly. This reduces drag torque that is generated between the plurality of inner clutch plates 43 and the plurality of outer clutch plates 44 when the four-wheel drive vehicle 100 is in the two-wheel drive mode (when the driving force transmission device 1 is not in operation and thus the clutch unit 4 is not transmitting the driving force between the first rotary member 31 and the second rotary member 32).

As shown in FIG. 4, when the four-wheel drive vehicle 100 is in the four-wheel drive mode, the fin plate 9 rotates in the clockwise direction (opposite direction to that shown by the arrow R). The lubricant L is thus subjected to the centrifugal force generated by the rotation of the fin plate 9 and a flow T of the lubricant L (dashed lines) is formed accordingly. At this time, a part of the lubricant L on the blade portions 91 is scattered by the centrifugal force of the fin plate 9. This lubricant L is scattered onto the second side surface 211c of the oil receiving portion 211. The lubricant L is therefore not collected in the oil receiving portion 211.

As shown in FIG. 9, the lubricant L collected by the oil receiving portion 211 flows into the inlet port 222b of the reservoir chamber 222 of the second housing member 22, flows downward along the outer peripheral surface of the outer partition wall 223, and finally flows into the second accommodating chamber 2b through the flow hole 10a. The lubricant L scooped up by the fin plate 9 thus circulates in a circulation path formed by the oil receiving portion 211, the inlet port 222b, the reservoir chamber 222, the flow hole 10a of the lid member 10, and the second accommodating chamber 2b in this order.

The first embodiment described above has the following functions and effects.

(1) The clutch hub 41 rotates with the first rotary member 31, and the fin plate 9 is coupled to the clutch hub 41 so that the fin plate 9 cannot rotate relative to the clutch hub 41. The fin plate 9 rotates with the clutch hub 41 and thus feeds the lubricant L in the second accommodating chamber 2b to the oil receiving portion 211. Accordingly, the lubricant L in the second accommodating chamber 2b can be efficiently supplied to the reservoir chamber 222 through the oil receiving portion 211. This reduces drag torque that is generated between the plurality of inner clutch plates 43 and the plurality of outer clutch plates 44 when the four-wheel drive vehicle 100 is in the two-wheel drive mode, namely when the driving force transmission device 1 is not in operation and is not transmitting the driving force.

(2) The reservoir chamber 222 is formed in the second housing member 22 so as to face the second accommodating chamber 2b along the rotation axis O. This can reduce the radial dimension as compared to the case where the reservoir chamber is formed outside the clutch unit in the radial direction as in, e.g., the driving force transmission device described in JP 2013-100079 A. The size of the driving force transmission device 1 can therefore be reduced.

(3) The fin plate 9 is a single-piece member made of a resin material. A lubricant feed member that feeds the lubricant L to the reservoir chamber 222 can thus be produced with an inexpensive, simple configuration. More specifically, in order to increase the amount of lubricant L that is scooped up in, e.g., the driving force transmission device described in JP 2013-100079 A, the outer peripheral surface of the clutch drum which corresponds to the surface scooping up the lubricant L need be machined such as forming protrusions and recesses. According to the present embodiment, the fin plate 9 can be produced by injection molding etc. using the resin material. The fin plate 9 that can feed the lubricant L can be easily produced. That is, the amount of lubricant L that is fed can be increased without increasing production cost. Effects similar to those described above can also be provided in the case where the fin plate 9 is formed by pressing a steel plate etc. as described in the embodiment.

(4) The second accommodating chamber 2b is separated from the reservoir chamber 222 by closing a part of the opening 222a of the reservoir chamber 222 by the lid member 10. The lubricant L stored in the reservoir chamber 222 therefore does not leak into the second accommodating chamber 2b. The lubricant L can thus be efficiently stored in the reservoir chamber 222.

(5) The reservoir chamber 222 is formed in an annular shape around the outer periphery of the insertion hole 220 through which the first rotary member 31 is inserted, and the inlet port 222b is located above the opening 222a. This allows the reservoir chamber 222 to have a simple configuration and has a sufficient capacity.

(6) The inlet port 222b is formed at a position higher than the level of the lubricant L in the second accommodating chamber 2b in the second steady state. The lubricant L stored in the reservoir chamber 222 can therefore be smoothly supplied to the clutch unit 4.

(7) The first housing member 21 has the oil receiving portion 211 at one position in the circumferential direction in order to collect the lubricant L scooped up by the blade portions 91 of the fin plate 9, and the oil receiving portion 211 is separated from the second accommodating chamber 2b by the partition wall 212. The lubricant L scooped up by the fin plate 9 can therefore be efficiently collected.

(8) The oil receiving portion 211 receives the lubricant L scooped up by the blade portions 91 of the fin plate 9 through the inlet port 213 that is not closed by the partition wall 212. The lubricant L can therefore be collected by a simple configuration.

(9) When the four-wheel drive vehicle 100 is in the four-wheel drive mode, the lubricant L stored in the reservoir chamber 222 is supplied to the second accommodating chamber 2b through the flow hole 10a in the lid member 10. This can restrain wear of the plurality of inner clutch plates 43 and the plurality of outer clutch plates 44.

A second embodiment of the present invention will be described with reference to FIGS. 10 and 11.

Figure 10:
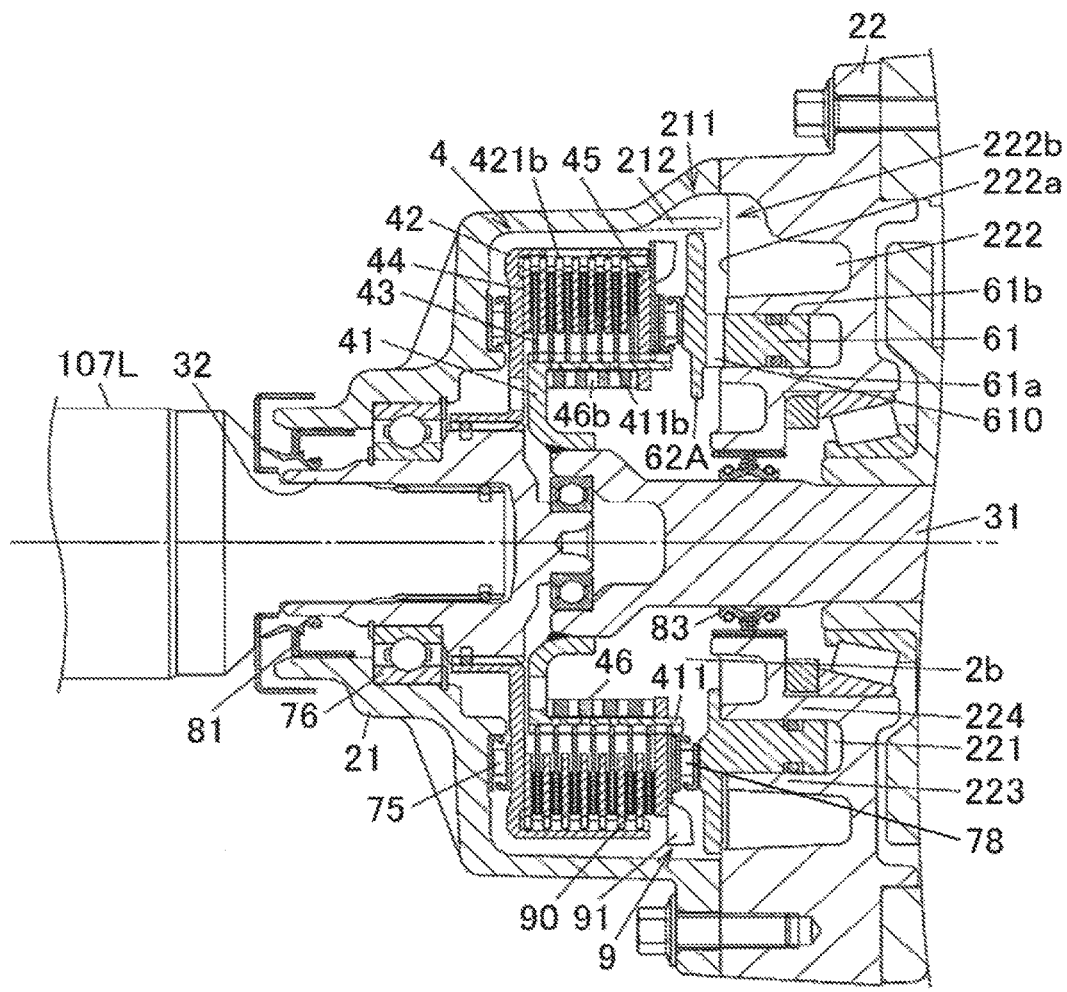
FIG. 10 is a horizontal sectional view showing an example of the configuration of a driving force transmission device according to a second embodiment.

FIG. 10 is a partial enlarged sectional view of a driving force transmission device according to a second embodiment. FIG. 11 is an enlarged view of a main part of the driving force transmission device according to the second embodiment, illustrating the flow of the lubricant L in a piston member and its surrounding region in the driving force transmission device shown in FIG. 10.

The driving force transmission device of the present embodiment is similar in function to the driving force transmission device 1 of the first embodiment, but is different in configuration of the piston member 6 and the lid member 10 from the driving force transmission device 1 of the first embodiment. The difference between the first and second embodiments will be mainly described below. In FIG. 10, the same components as those described in the first embodiment are denoted with the same reference characters as those of FIG. 3, and description thereof will be omitted.

The lid member 10 and the piston member 6 are separate members in the first embodiment. In the present embodiment, however, the lid member 10 and the piston member 6 together form a single-piece member, and the reservoir chamber 222 is switched to an open state and a closed state as the piston member 6 is advanced and withdrawn. This configuration will be described in more detail below.

The piston member 6 is a single-piece member formed by a supported portion 61 and a lid portion 62A. The supported portion 61 is supported so that it can move in the direction of the rotation axis O. The lid portion 62A can close at least a part of the opening 222a of the reservoir chamber 222. The piston member 6 cuts off the flow of the lubricant L from the reservoir chamber 222 into the second accommodating chamber 2b when the piston member 6 is in a closing state, and allows the lubricant L stored in the reservoir chamber 222 to be supplied to the second accommodating chamber 2b when the piston member 6 is in an opening state. In FIG. 10, the piston member 6 in the opening state is shown above the rotation axis O, and the piston member 6 in the closing state is shown below the rotation axis O.

The supported portion 61 of the piston member 6 is accommodated in the cylinder chamber 221 of the second housing member 22. The lid portion 62A of the piston member 6 faces the fin plate 9 at a position outside the cylinder chamber 221. The bearing 78 is placed between the lid portion 62A of the piston member 6 and the fin plate 9. The bearing 78 is a thrust roller bearing.

When hydraulic oil is supplied from the hydraulic unit 14 to the cylinder chamber 221, the supported portion 61 is subjected to the pressure of the hydraulic oil and the piston member 6 is moved toward the clutch unit 4. When the pressure of the hydraulic oil in the cylinder chamber 221 decreases, the lid portion 62A is subjected to the biasing force (restoring force) of the elastic member 46 via the fin plate 9 and the bearing 78, and the piston member 6 is moved to the opposite side from the clutch unit 4.

When the piston member 6 is moved to the opposite side from the clutch unit 4, the lid portion 62A closes the opening 222a of the reservoir chamber 222. When the piston member 6 is moved toward the clutch unit 4, the opening 222a of the reservoir chamber 222 is opened, and the lubricant stored in the reservoir chamber 222 flows into the second accommodating chamber 2b.

The reservoir chamber 222 has the inlet port 222b for the lubricant L at a position above the opening 222a. The inlet port 222b is not closed by the lid portion 62A when the piston member 6 is in the closing state. The reservoir chamber 222 is formed such that a part of the reservoir chamber 222 which corresponds to the inlet port 222b protrudes further outward in the radial direction than the range closed by the lid portion 62A of the piston member 6.

The supported portion 61 of the piston member 6 has a flow hole 610 that supplies the lubricant L stored in the reservoir chamber 222 to the second accommodating chamber 2b from a position above the rotation axis O when the piston member 6 is in the opening state. The flow hole 610 extends through the supported portion 61 in the radial direction and opens to the inner peripheral surface 61a and the outer peripheral surface 61b of the supported portion 61. The supported portion 61 has the flow hole 610 in its upper end, namely near the inlet port 222b of the reservoir chamber 222. In the present embodiment, the flow hole 610 is a long hole extending in the circumferential direction of the supported portion 61. However, the present invention is not limited to this. The flow hole 610 may be a round hole. In the present embodiment, the supported portion 61 has a single flow hole 610. However, the supported portion 61 may have a plurality of flow holes 610.

The inner cylindrical portion 411 of the clutch hub 41 has a plurality of oil holes 411b through which the lubricant L flows in the radial direction. The elastic member 46 also has a plurality of oil holes 46b through which the lubricant L flows in the radial direction. The cylindrical portion 421 of the clutch drum 42 also has a plurality of oil holes 421b through which the lubricant L flows in the radial direction.

As shown in FIG. 11, if the piston member 6 is switched from the opening state to the closing state, and the fin plate 9 is rotated, the lubricant L scooped up by the fin plate 9 is collected by the oil receiving portion 211 and then flows into the reservoir chamber 222 through the inlet port 222b, as in the first embodiment.

On the other hand, if the hydraulic oil is supplied to the cylinder chamber 221 when the piston member 6 is in the closing state, the supported portion 61 of the piston member 6 is subjected to the pressure of the hydraulic oil and the piston member 6 is moved toward the clutch unit 4 in the direction of the rotation axis O. The plurality of inner clutch plates 43 and the plurality of outer clutch plates 44 are thus pressed via the fin plate 9 and the pressing member 45, and the lid portion 62A of the piston member 6 is separated from an end face 22a of the second housing member 22 on the second accommodating chamber 2b side, whereby the opening 222a of the reservoir chamber 222 is temporarily opened. The lubricant L stored in the reservoir chamber 222 thus flows into the second accommodating chamber 2b.

The lubricant L stored in the reservoir chamber 222 flows down through the flow hole 610 of the piston member 6 onto the outer peripheral surface of the first rotary member 31. The lubricant L on the outer peripheral surface of the first rotary member 31 is supplied between the inner and outer clutch plates 43, 44 through the oil holes 46b of the elastic member 46 and the oil holes 411b of the clutch hub 41 by the centrifugal force that is generated by rotation of the first rotary member 31 and the clutch hub 41. The lubricant L thus supplied between the inner and outer clutch plates 43, 44 is discharged from the opening and the oil holes 421b of the clutch drum 42, and a part of the discharged lubricant L flows along the inner surface of the second accommodating chamber 2b into the reservoir chamber 222 through the inlet port 222b.

The lubricant L that has flowed out from between the end face 22a of the second housing member 22 and the lid portion 62A of the piston member 6 without flowing through the flow hole 610 of the piston member 6 is also supplied between the inner and outer clutch plates 43, 44 through the oil holes 411b of the clutch hub 41 etc. and is discharge out of the clutch drum 42. A part of the discharged lubricant L flows into the reservoir chamber 222 through the inlet port 222b and flows down through the flow hole 610 of the piston member 6, as described below.

As described above when the four-wheel drive vehicle 100 is in the four-wheel drive mode in which the plurality of inner clutch plates 43 frictionally contact the plurality of outer clutch plates 44, the lubricant L circulates in a circulation path including the flow hole 610 of the piston member 6.

According to the present embodiment, when the piston member 6 is switched to the opening state, the lubricant L can be more quickly supplied to the clutch unit 4 as compared to the first embodiment. That is, the present embodiment has functions and effects similar to those of the first embodiment, and can also restrain wear of the plurality of inner clutch plates 43 and the plurality of outer clutch plates 44 in the four-wheel drive mode.

Although the driving force transmission device of the present invention is described above based on the first and second embodiments, the present invention is not limited to these embodiments. For example, the above embodiments are described only with respect to the case where the fin plate 9 rotates with the clutch hub 41. However, the present invention is not limited to this. For example, the driving force transmission device of the present invention may be configured so that the fin plate 9 rotates with the clutch drum 42.

What is claimed is:

1. A driving force transmission device, comprising:
   a first rotary member to which a driving force generated by a driving source of a vehicle is applied;
   a second rotary member configured to rotate relative to the first rotary member about the same rotation axis as that of the first rotary member;
   a clutch unit including a first clutch plate that rotates with the first rotary member, and a second clutch plate that rotates with the second rotary member;
   an accommodating member that accommodates a part of the first and second rotary members; and
   a lubricant feed member, wherein
   the driving force transmission device transmits the driving force from the first rotary member to the second rotary member by frictional engagement between the first and second clutch plates with lubricant therebetween,
   the accommodating member has an accommodating chamber that accommodates the clutch unit and a reservoir chamber that stores the lubricant, and
   the lubricant feed member is non-rotationally coupled to, and axially movable with, one of the first and second rotary members, to feed the lubricant in the accommodating chamber to the reservoir chamber,
   wherein the reservoir chamber has an opening on the accommodating chamber side, and the accommodating chamber is separated from the reservoir chamber by a lid member that closes at least a part of the opening of the reservoir chamber.

2. The driving force transmission device according to claim 1, wherein
   the accommodating chamber and the reservoir chamber are mutually spaced along the rotation axis and face each other along the rotation axis.

3. The driving force transmission device according to claim 2, wherein
   the lubricant feed member has a blade portion that scoops up the lubricant in the accommodating chamber.

4. The driving force transmission device according to claim 3, wherein
   the blade portion has a flat plate that extends perpendicular to a direction along the rotation axis, and a scoop-up plate that stands from an end face of the flat plate, which faces the reservoir chamber, and that has a scoop-up surface that faces the same direction as a rotational direction of the lubricant feed member, and the lubricant in the accommodating chamber is held between the end face and the scoop-up surface when the lubricant feed member is rotated.

5. The driving force transmission device according to claim 4, wherein
   the lubricant feed member is a single-piece member using a resin material.

6. The driving force transmission device according to claim 4, wherein
   the lubricant feed member is a plate-like steel sheet.

7. The driving force transmission device according to claim 1, wherein
   the reservoir chamber has an inlet port that is located at a position above the opening and that is not closed by the lid member, and the lubricant scooped up by the rotation of the lubricant feed member flows into the reservoir chamber through the inlet port.

8. The driving force transmission device according to claim 7, wherein
   the inlet port is located at a position higher than a level of the lubricant in the accommodating chamber.

9. The driving force transmission device according to claim 1, wherein
   the accommodating member is a cylindrical member, and has at one position in a circumferential direction a collecting chamber that collects the lubricant scooped up by the lubricant feed member, and the collecting chamber has an opening that opens to the accommodating chamber and is separated from the accommodating chamber by a partition wall that closes a part of the opening of the collecting chamber.

10. The driving force transmission device according to claim 9, wherein,
    the collecting chamber has an inlet port that is not closed by the partition wall, and the inlet port allows the lubricant scooped up by the lubricant feed member to be introduced into the collecting chamber.

11. The driving force transmission device according to claim 7, wherein,
    the lid member has a flow hole through which the lubricant stored in the reservoir chamber flows into the accommodating chamber.

12. The driving force transmission device according to claim 7, wherein,
    the lid member is placed so as to be movable together with a piston member that applies a fastening force to the first and second clutch plates, and the piston member is switched, in accordance with movement of the piston member, between an opening state where the opening of the collecting chamber is not closed by the lid member and a closing state where a part of the opening is closed by the lid member.

13. The driving force transmission device according to claim 1, wherein the lubricant feed member is coupled to one of the first and second rotary members.

14. A driving force transmission device, comprising:
    a first rotary member to which a driving force generated by a driving source of a vehicle is applied;
    a second rotary member configured to rotate relative to the first rotary member about the same rotation axis as that of the first rotary member;
    a clutch unit including a first clutch plate that rotates with the first rotary member, and a second clutch plate that rotates with the second rotary member;
    an accommodating member that accommodates a part of the first and second rotary members, wherein the accommodating member has an accommodating chamber that accommodates the clutch unit and a reservoir chamber that stores the lubricant; and
    lubricant feed means rotatable with one of the first and second rotary members to feed the lubricant in the accommodating chamber to the reservoir chamber, wherein the driving force transmission device transmits the driving force from the first rotary member to the second rotary member by frictional engagement between the first and second clutch plates with lubricant therebetween,
wherein the reservoir chamber has an opening on the accommodating chamber side, and the accommodating chamber is separated from the reservoir chamber by a lid member that closes at least a part of the opening of the reservoir chamber.

\* \* \* \* \*